(12) United States Patent
Gates et al.

(10) Patent No.: US 7,246,840 B2
(45) Date of Patent: Jul. 24, 2007

(54) VEHICLE LIFTGATE WINDOW COMPONENT MODULE

(75) Inventors: Terence M. Gates, Birmingham, MI (US); Philippe Gougeon, Bloomfield Hills, MI (US); Leonida S. Vaitus, Windsor (CA); William Ethan A. McClure, Clawson, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 45 days.

(21) Appl. No.: 10/862,266

(22) Filed: Jun. 7, 2004

(65) Prior Publication Data

US 2004/0245801 A1  Dec. 9, 2004

Related U.S. Application Data

(63) Continuation-in-part of application No. 10/360,220, filed on Jan. 31, 2003, now Pat. No. 6,746,072.

(60) Provisional application No. 60/547,214, filed on Feb. 24, 2004.

(51) Int. Cl.
*B60J 5/10* (2006.01)
*E05B 15/02* (2006.01)

(52) U.S. Cl. .............. 296/106; 296/146.8; 296/96.15; 296/96.17; 292/341.15

(58) Field of Classification Search ............ 296/146.8, 296/146.1, 50, 146.9, 96.17, 52, 152, 102, 296/96.15; 49/502; 16/2.1; 292/341.15
See application file for complete search history.

(56) References Cited

U.S. PATENT DOCUMENTS

| 4,378,484 A | 3/1983 | Kunert |
| 4,722,206 A | 2/1988 | Shiratori et al. |
| 5,035,449 A | 7/1991 | Shiratori et al. |
| 5,203,602 A | 4/1993 | Estache |
| 5,271,120 A | 12/1993 | Eustache et al. |
| 5,561,882 A | 10/1996 | Eustache et al. |
| 5,605,071 A | 2/1997 | Buchanan, Jr. |
| 5,621,942 A * | 4/1997 | Eustache et al. ........... 15/250.3 |
| 5,797,159 A | 8/1998 | Berge et al. |
| 5,946,763 A | 9/1999 | Egner-Walter et al. |
| 6,019,292 A | 2/2000 | Walther |
| 6,019,418 A | 2/2000 | Emerling et al. |
| 6,020,611 A | 2/2000 | Ma et al. |
| 6,027,075 A | 2/2000 | Petrenko |
| 6,030,105 A | 2/2000 | Thau et al. |

(Continued)

FOREIGN PATENT DOCUMENTS

EP  0111457  6/1984

(Continued)

*Primary Examiner*—D. Glenn Dayoan
*Assistant Examiner*—Greg Blankenship
(74) *Attorney, Agent, or Firm*—Young Basile

(57) ABSTRACT

A liftgate component module mountable on a pivotal liftgate window provides a unitary mounting platform for a plurality of components including a window wiper drive motor and a window latch. A unitary bracket carries the wiper drive apparatus and the window latch apparatus. A handle, which may include an electrical switch, is also mounted on the window. The electrical connections between the handle switch and a controller carried on the window as part of the motor enables instantaneous response of the latch to activation of the handle switch. The same controller can also control a liftgate latch and a liftgate electrical switch handle.

11 Claims, 17 Drawing Sheets

U.S. PATENT DOCUMENTS

| | | | |
|---|---|---|---|
| 6,123,384 A * | 9/2000 | Eustache et al. ......... 296/146.2 |
| 6,131,989 A | 10/2000 | Montone et al. |
| 6,174,016 B1 | 1/2001 | Ponziani |
| 6,216,309 B1 | 4/2001 | Goto et al. |
| 6,223,385 B1 | 5/2001 | Berge et al. |
| 6,234,564 B1 | 5/2001 | Kim |
| 6,240,593 B1 | 6/2001 | Murata |
| 6,298,519 B1 | 10/2001 | Berge et al. |
| 6,416,106 B2 | 7/2002 | Ponziani |
| 6,435,596 B1 | 8/2002 | Pyo |
| 6,458,002 B1 | 10/2002 | Buchanan, Jr. |
| 6,493,900 B1 | 12/2002 | Koumo et al. |
| 6,523,882 B2 | 2/2003 | Ishikawa |
| 6,557,205 B2 | 5/2003 | Ishikawa |
| 6,637,801 B1 | 10/2003 | Eustache et al. |
| 6,719,362 B1 | 4/2004 | Johnson et al. |
| 6,746,072 B1 | 6/2004 | Romesburg et al. |
| 6,834,906 B2 | 12/2004 | Vaitus |
| 2001/0001336 A1 | 5/2001 | Kobayashi et al. |
| 2001/0011831 A1 | 8/2001 | Ohashi et al. |
| 2003/0146645 A1 | 8/2003 | Cathaya et al. |
| 2004/0041438 A1 | 3/2004 | Simon et al. |
| 2004/0084935 A1 | 5/2004 | Johnson et al. |
| 2004/0124659 A1 | 7/2004 | Vaitus et al. |
| 2004/0124664 A1 | 7/2004 | McClure et al. |
| 2004/0130177 A1 | 7/2004 | Cathala |
| 2004/0150250 A1 | 8/2004 | Gougeon et al. |
| 2004/0155391 A1 | 8/2004 | Izabel |

FOREIGN PATENT DOCUMENTS

| | | |
|---|---|---|
| EP | 0 354 646 | 2/1990 |
| EP | 0 489 630 | 6/1992 |
| EP | 0 574 309 | 12/1993 |
| EP | 0 694 453 | 1/1996 |
| EP | 0 916 559 | 5/1999 |
| EP | 1 074 442 | 2/2001 |
| EP | 1 083 101 | 3/2001 |
| EP | 1 167 137 | 1/2002 |
| EP | 1 348 614 | 10/2003 |
| FR | 2 801 017 | 5/2001 |
| FR | 2 822 792 | 10/2002 |
| FR | 2824041 | 10/2002 |
| FR | 2825063 | 11/2002 |
| FR | 2 827 565 | 1/2003 |
| FR | 2 841 488 | 1/2004 |
| FR | 2 842 154 | 1/2004 |
| GB | 1580926 | 12/1980 |
| GB | 2 327 598 | 2/1999 |
| GB | 2 347 340 | 9/2000 |
| JP | 11 301 420 | 11/1999 |
| JP | 2000062575 | 2/2000 |
| JP | 2000326830 | 11/2000 |
| WO | WO 01/08945 A1 | 2/2001 |
| WO | WO 03/002363 | 1/2003 |
| WO | WO 2004/026647 A1 | 4/2004 |
| WO | WO 2004/037622 | 5/2004 |

* cited by examiner

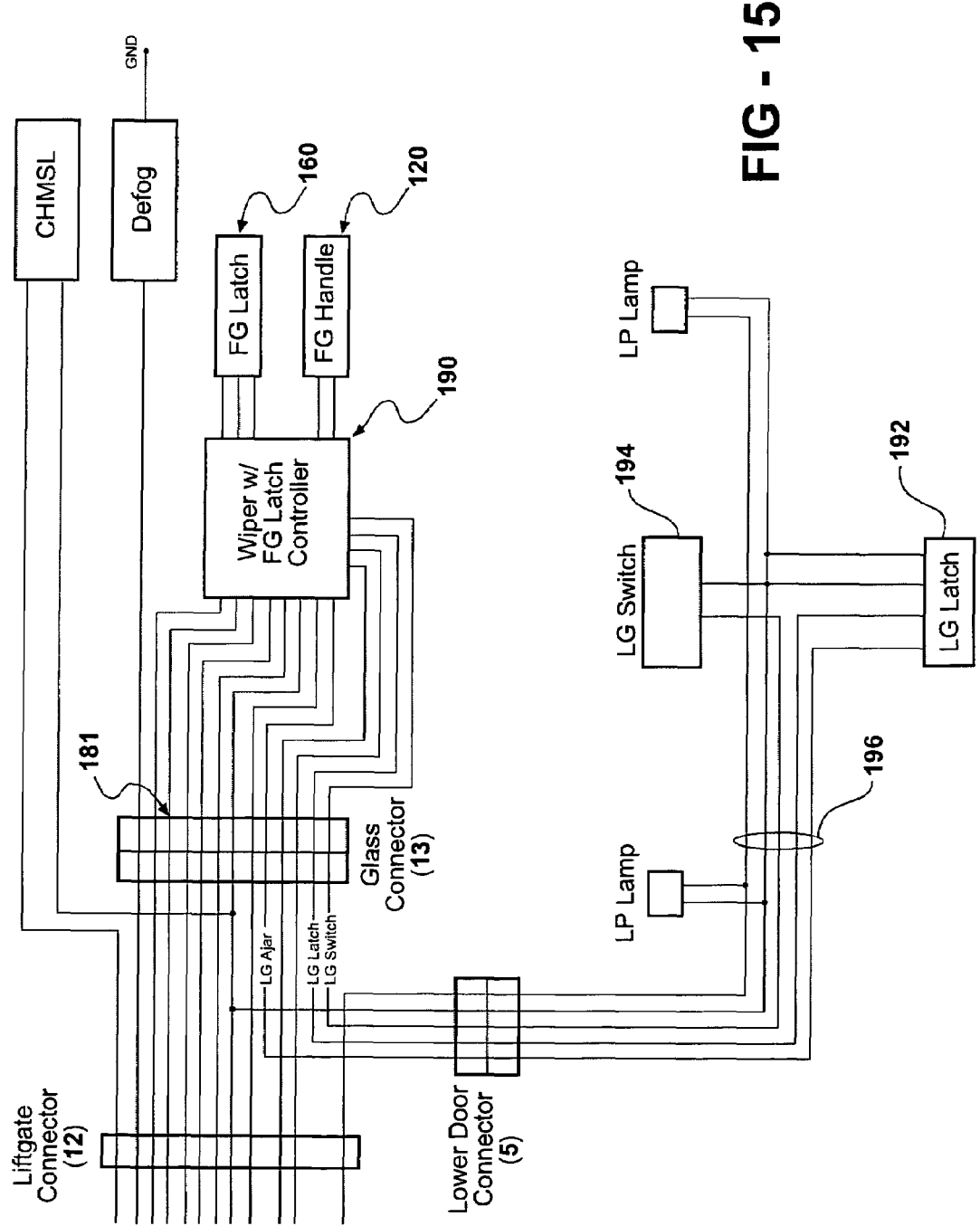

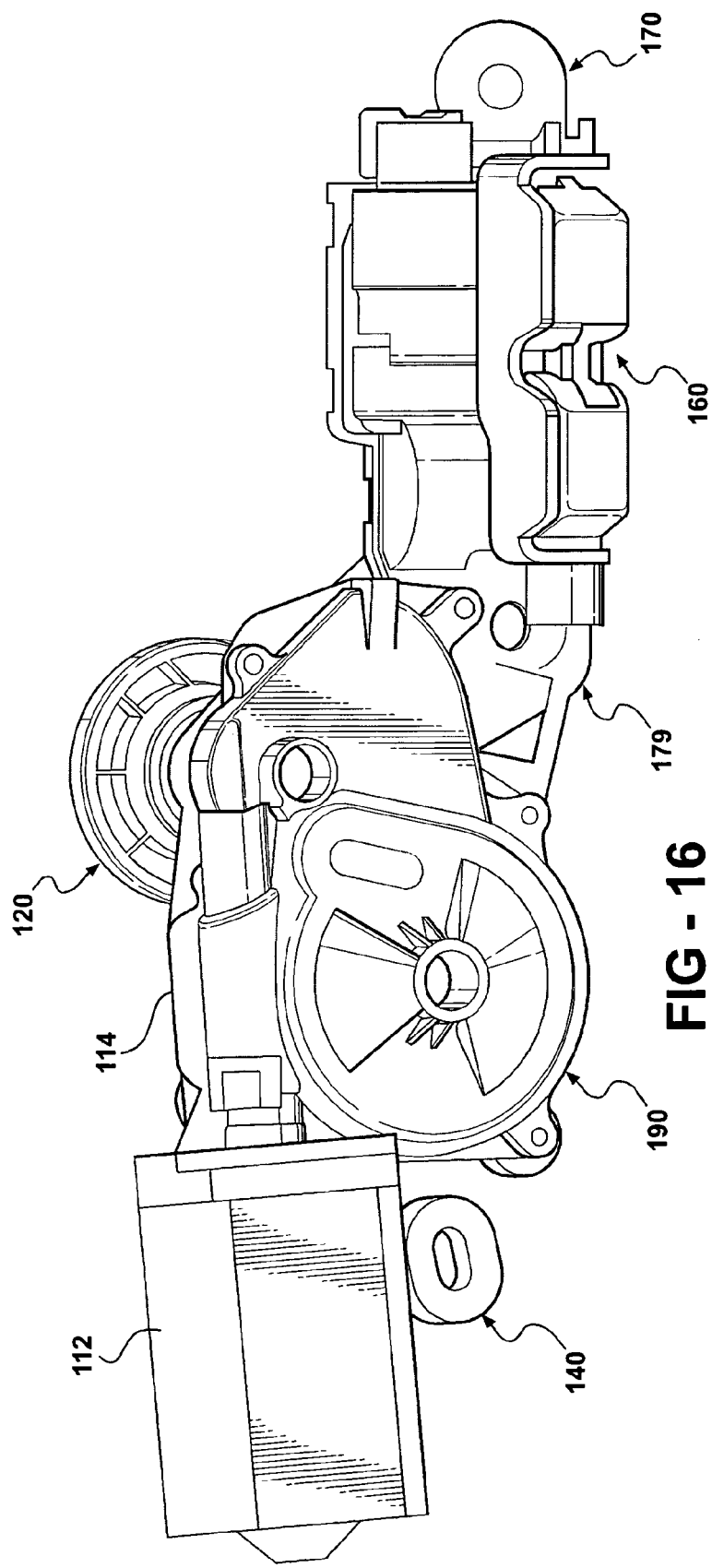

VEHICLE LIFTGATE WINDOW COMPONENT MODULE

CROSS REFERENCE TO CO-PENDING APPLICATIONS

This application is a continuation-in-part of U.S. patent application Ser. No. 10/360,220, filed Jan. 31, 2003, now U.S. Pat. No. 6,746,072, which is entitled "Vehicle Liftgate With Accessory Component Module", and claims the benefit of the priority filing date of U.S. provisional patent application Ser. No. 60/547,214, filed Feb. 24, 2004, which is entitled "e-Module V", the contents of both of which are incorporated herein in their entirety.

BACKGROUND

The present invention relates, in general, to motor vehicle liftgates or rear hatches and, more specifically, to accessory components mounted on such vehicle liftgate or rear hatches.

In modern vehicles, larger vehicles such as SUVs, vans and station wagons have a liftgate or rear hatch which closes a rear opening in the vehicle body. The liftgate is pivotally attached, usually by hinges, to the vehicle body structure surrounding the rear opening. The liftgate is releasably latchable to the vehicle structure by a latch mechanism so as to be movable between a closed position latched to the vehicle body structure and a pivoted, open position allowing access to the interior of the vehicle through the rear opening.

The liftgate itself is formed of a panel structure, which is stamped or otherwise formed into a panel having an upper opening for receiving a glass window. An interior trim panel is attachable to the liftgate panel to cover components mounted on the gate.

The liftgate forms a platform for a number of different accessories or components, such as a flipglass latch, a wiper motor and associated wiper arm, license plate lights, and a wash pump and/or wash nozzle. Various lights as well as the center high mounted stop light may also be mounted on the liftgate along with the liftgate latch mechanism. Other components which are usually mounted on the liftgate can include electrical contact connections to the defrost grid mounted on the liftgate glass or fiberglass.

The above-described components, such as the wiper drive motor and a window pivot lift handle, either mechanical or electronic switch-based, have been mounted on the liftgate window which may be provided as a pivotal "flipglass." In the case of a flipglass, a latch unit has been fixed to the liftgate structure and releasably engages a striker fixedly mounted on the glass to latch the flipglass in a closed position on the liftgate or to enable the flipglass to be pivoted about hinges at an upper portion of the liftgate to a pivoted outward extending position with respect to the general plane of the liftgate.

In the case of the electronic switch-based handles, a switch is carried in a handle-like cover mounted exteriorly of the flipglass. Dedicated control wires from the switch typically extend through vehicle body-mounted wiring harnesses to the main vehicle controller, typically located in the forward portion of the vehicle, in or near the engine compartment, wherein the signal is processed by the controller and an appropriate activation signal returned along another dedicated wire to the flipglass latch to release the latch from the striker. Depending on the vehicle, this sequence may present a considerable delay between the activation of the switch and the actual release of the liftgate latch from the striker.

All of these accessories or components are manufactured separately from the liftgate panel structure and are mounted, usually one at a time, on the liftgate while the vehicle is being assembled. The mounting of each component on the liftgate panel either directly or through brackets typically requires mechanical fasteners and, usually, an electrical connection via a plug-in connector, screw terminal, etc. All of the mounting procedures, and the mechanical and electrical connections require time, multiple workers and an increased length on the vehicle assembly line. In addition, although each component can be tested at its manufacturing site, the numerous multiple mechanical and electrical connections all create additional sources of defects which may require additional checking after assembly on the liftgate.

As can be seen, all of these factors lead to a substantial assembly time for the liftgate thereby resulting in a higher than desirable cost. To address these problems, a modular approach has been proposed in which several components are separably manufactured, pretested, and assembled into a single module, with only the module having to be mounted in a single operation on a liftgate. The number of separate mechanical fasteners and electrical connections can also be reduced by this modular approach. However, the modular approach has been proposed only for a limited number of components. This has resulted in less than anticipated savings in assembly time and labor.

Thus, it would be desirable to provide an improved modular component apparatus for vehicle liftgates in which multiple components are mounted in a single module for a single installation on the liftgate thereby improving reliability and reducing assembly costs. It would also be desirable to provide an improved modular component apparatus for vehicle liftgates in which multiple components are mounted directly on the liftgate flipglass in such a manner as to provide a large glass viewing area. It would also be desirable to provide an improved modular component apparatus for vehicle liftgates in which an electronic switch-based handle is mounted on the liftgate flipglass, with control functions implemented directly in the motor controller for immediate response by the flipglass latch.

SUMMARY

The present invention is a liftgate component module which is mountable on a vehicle liftgate window carried on a liftgate. The module includes a window wiper drive motor and a flip window latch apparatus and an electrical switch/handle mounted on the liftgate window.

In another aspect of the present invention, a vehicle liftgate is provided with and includes a liftgate panel, a pivotal flipglass mounted on the panel for movement between a first closed position and a second open position relative to the panel. The striker is carried on the liftgate panel. The liftgate window wiper drive apparatus and a liftgate window latch apparatus are unitarily joined for one-step mounting on the liftgate window.

In another aspect, a handle, which may carry an electrical switch, is also mounted on the liftgate window. Control wires from the electrical switch run directly to a controller carried on the wiper drive motor, for example, to enable quick response of the flipglass latch upon activation of the handle switch without noticeable delay.

In another aspect, a liftgate component apparatus is mounted on a liftgate. The apparatus includes a window wiper drive means for reciprocating a wiper arm, a window latch means for releasably latching a liftgate window to a liftgate, a liftgate latch means for releasably latching a liftgate to a vehicle, an electrical handle means for generating a window latch release signal when activated an electrical handle means for generating a liftgate latch release signal when activated and, a control means carried on the liftgate and responsive to the window latch release signal and the liftgate latch release signal for controlling the operation of the window latch and the liftgate latch.

In this aspect, the same controller used to control the wiper drive motor and/or the flipglass latch may also be used to control a liftgate latch in response to latch a release signal generated by a liftgate electrical switch handle mounted on the liftgate. This ensures a quick response of the liftgate latch upon activation of the liftgate handle switch.

In another aspect, the wiper drive motor, gearbox and window latch are arranged in an elongated, generally planar orientation for compact mounting on a liftgate window to maximize window viewing area.

The liftgate mounted accessory module of the present invention provides many advantages over previously devised methods for mounting liftgate components on a liftgate or a liftgate window. First, the plurality of window mounted components are unitarily mounted on a bracket which is attachable to the liftgate window in a one-step mounting operation.

Further cost advantages and simplified assembly are obtained by providing the mounting bracket as an integral extension of the wiper drive motor housing. As both the wiper drive motor and the liftgate window latch apparatus may be unitarily coupled prior to mounting on the liftgate window, the number of electrical and mechanical connections are reduced and the reliability of the individual components increased since the components can be preassemble, prewired and tested, if desired, prior to mounting on the vehicle. The use of a single module to mount multiple components on the liftgate window also reduces the number of workers required in the vehicle assembly plant to install each component separately as well as reducing assembly line length required for the multiple component assembly operations and the time required for such assembly.

The mounting of the handle on the liftgate flipglass or window provides the dual functions of providing a convenient lift point to pivot the window between open and closed positions as well as to house an electrical switch. The routing of the switch wires directly to a controller mounted on the wiper drive motor enables quick response of the latch to an activation of the handle switch. This eliminates the noticeable delay which occurs in many vehicles between activation of an electronic handle switch on a liftgate flipglass and the subsequent response of the window latch.

BRIEF DESCRIPTION OF THE DRAWING

The various features, advantages and other uses of the present invention will become more apparent by referring to the following detailed description and drawing in which:

FIG. 15 is a schematic diagram of the component module controller;

FIG. 16 is a rear perspective view showing the mounting connections between the window drive motor and the flipglass latch;

DETAILED DESCRIPTION

Figure 1:
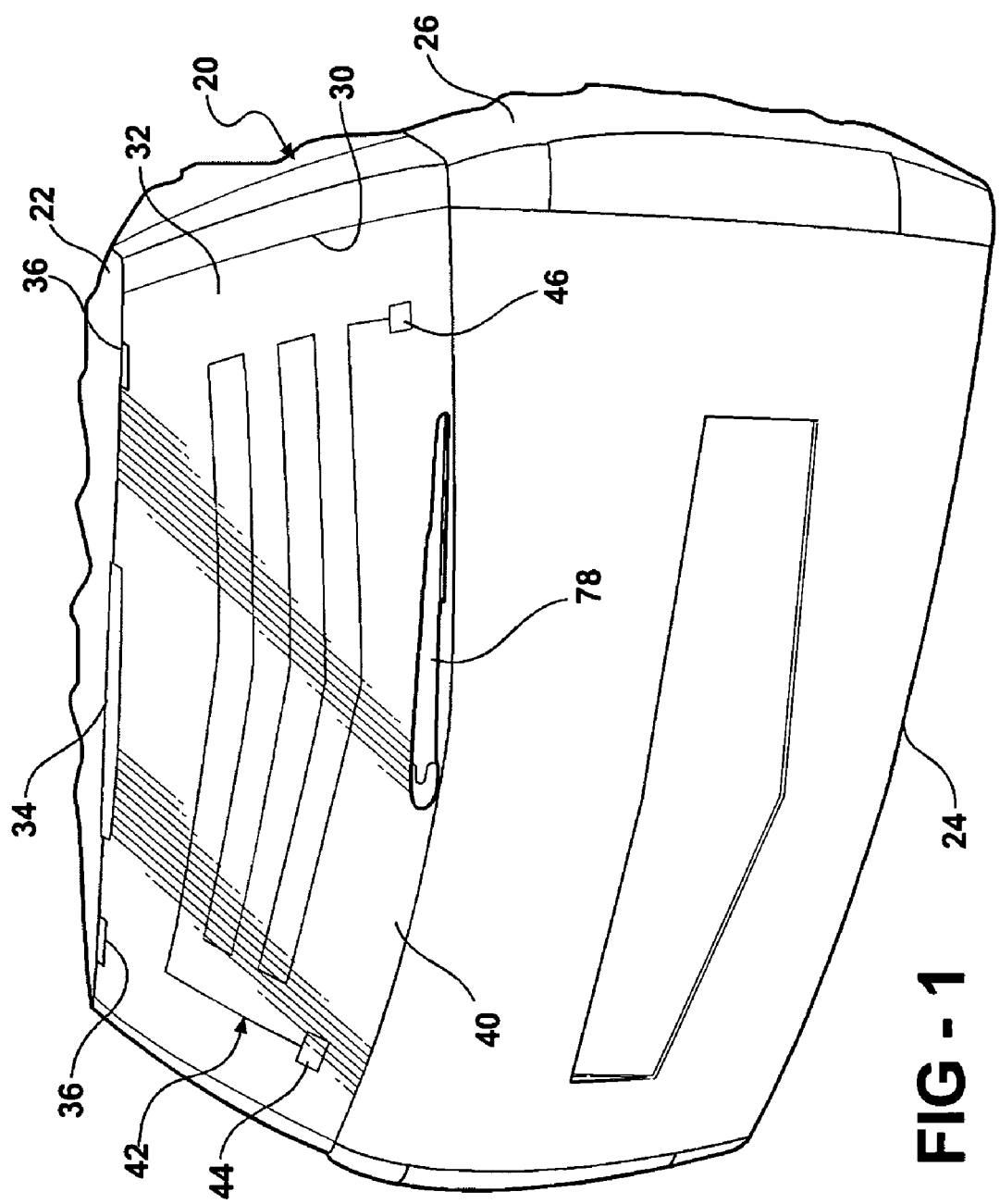
FIG. 1 is a front exterior elevational view of an exemplary vehicle liftgate utilizing one aspect of a component module according to the present invention.
Figure 2:
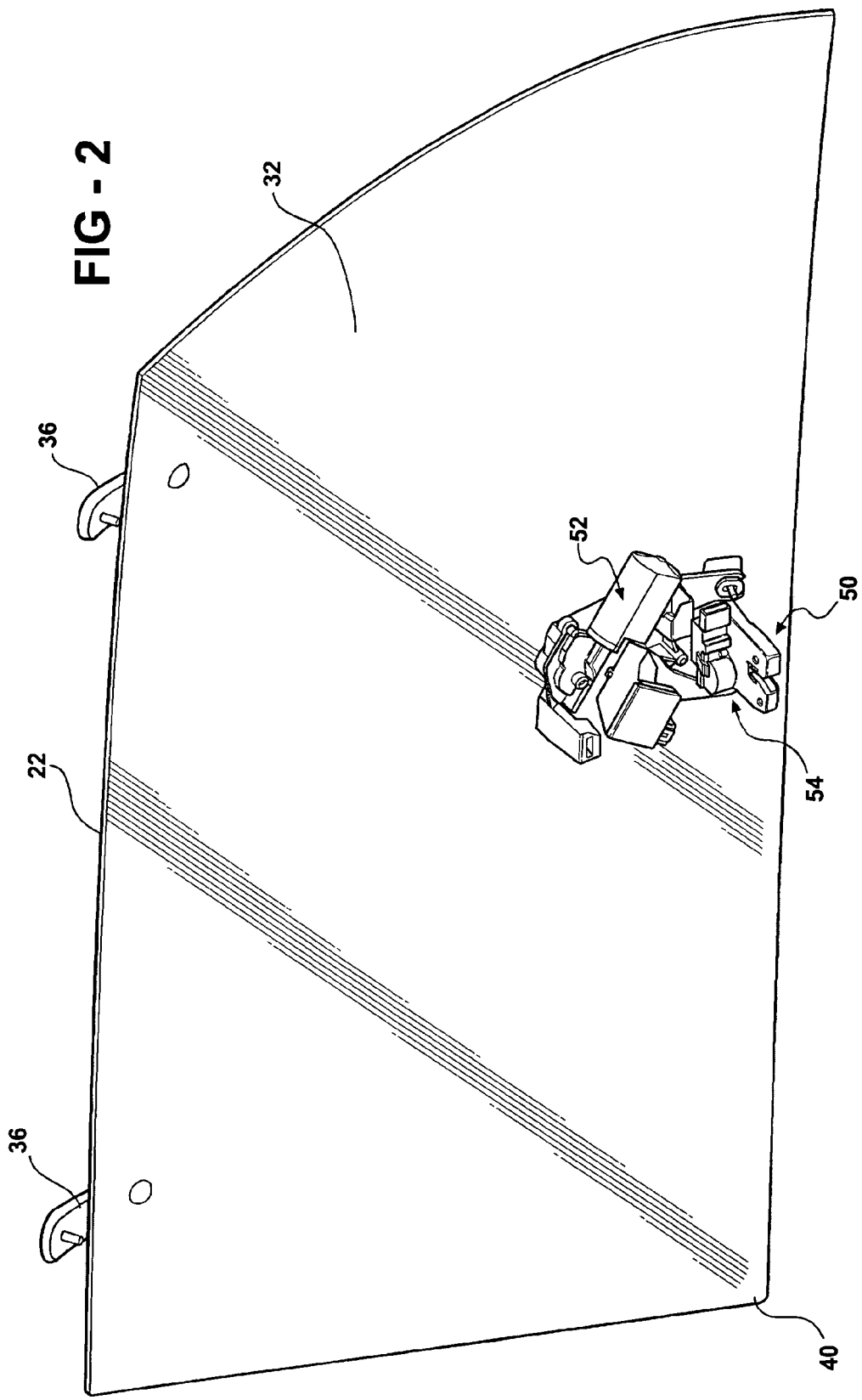
FIG. 2 is a perspective interior view of the component module shown mounted on the liftgate window.
Figure 3:
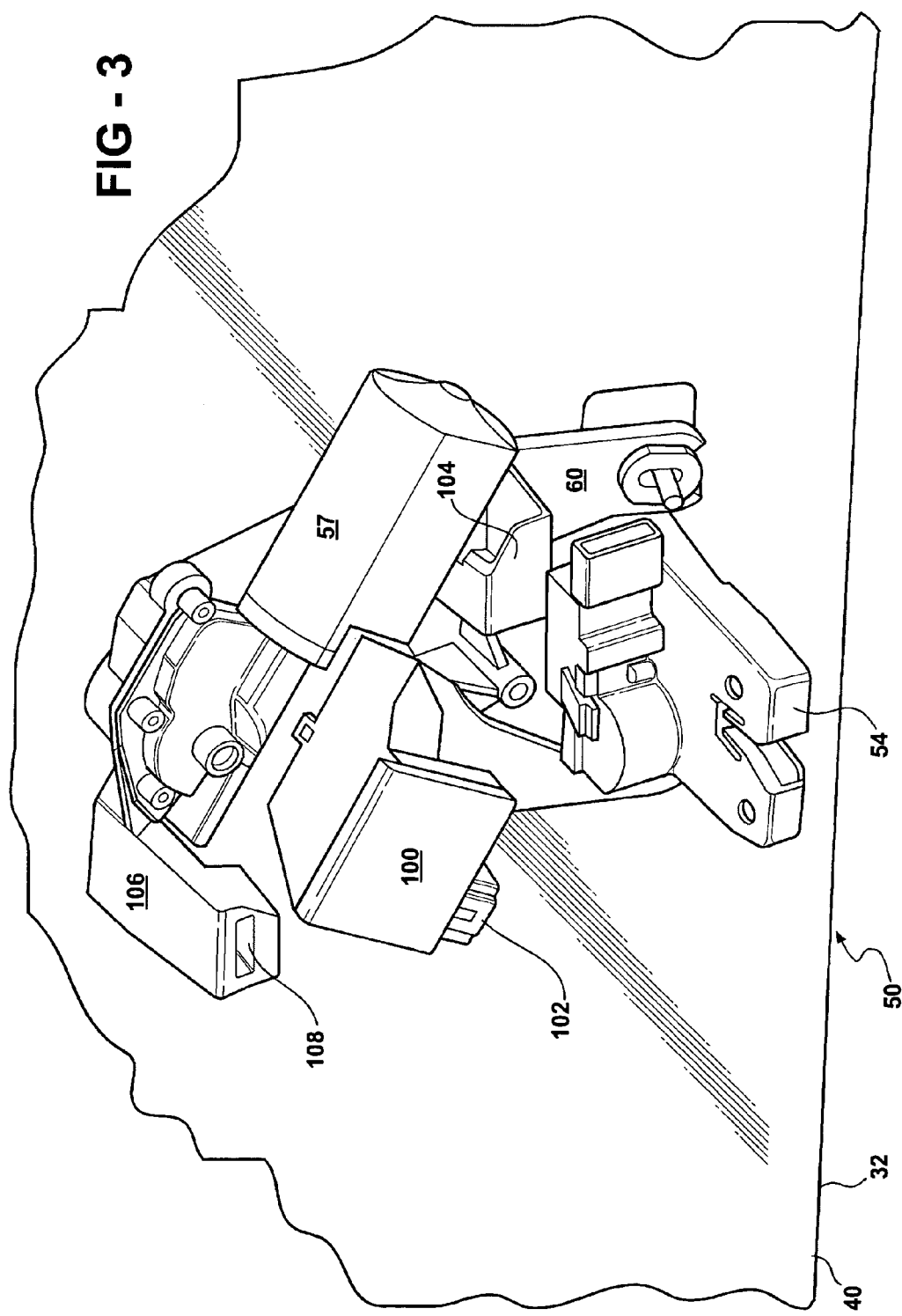
FIG. 3 is an enlarged, perspective view of the component module shown in FIG. 2.
Figure 4:
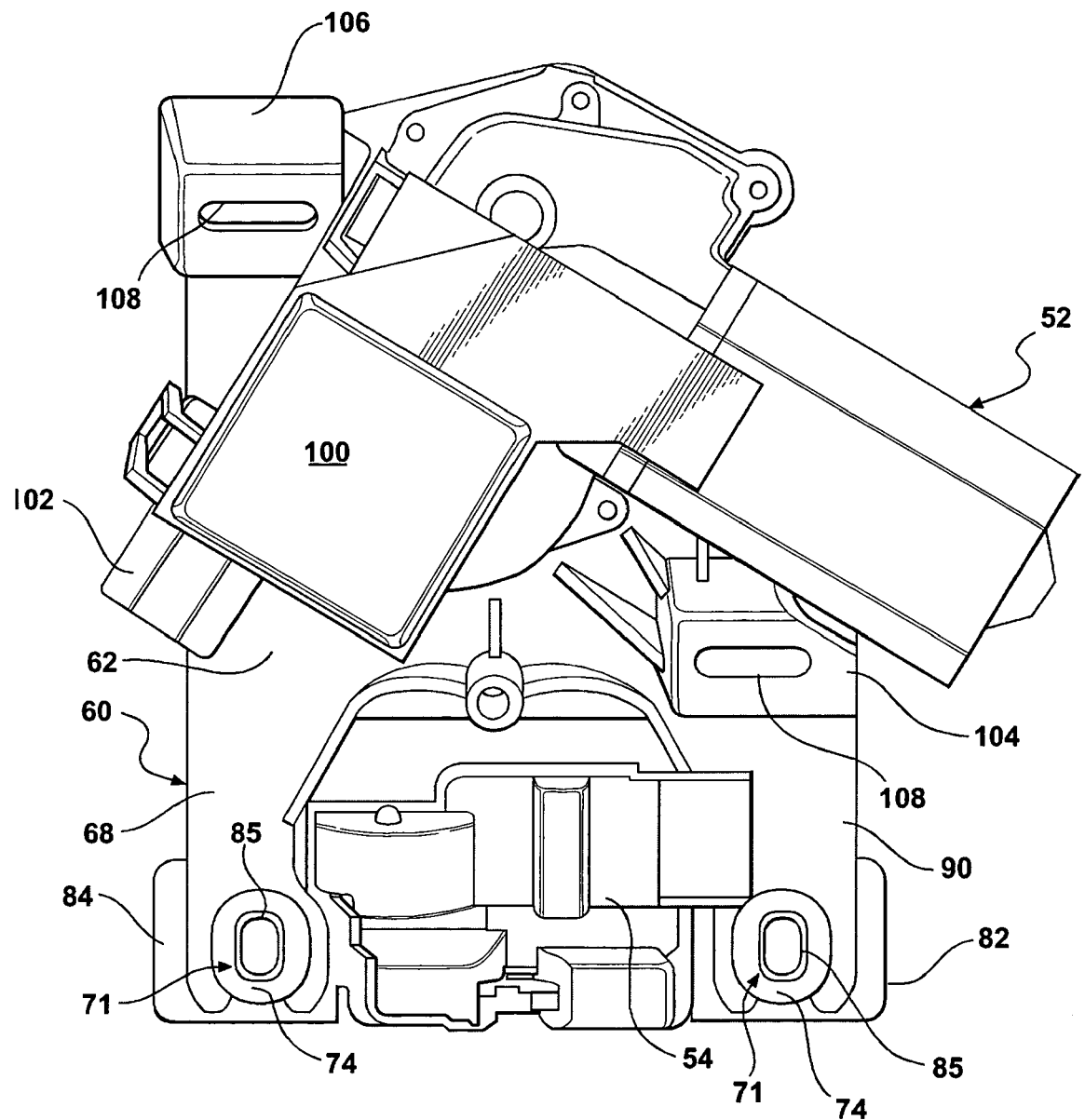
FIG. 4 is a front elevational view of the component module shown in FIGS. 2 and 3.

Referring now to the drawing, and to FIG. 1 in general, there is depicted a pictorial representation of a motor vehicle liftgate or rear hatch 20. The shape of the liftgate 20 will vary from vehicle to vehicle.

The liftgate 20 is intended, by example only, to be articulated or pivoted about an upper generally horizontally extending edge 22 by means of hinges attached to the surrounding vehicle body structure, not shown. When the liftgate 20 is pivotally mounted about the upper edge 22, the latch means will normally be associated with an opposed bottom edge 24. The liftgate 20 may also be articulated to the vehicle body about a vertical axis on one of the lateral side edges, with the opposite lateral edge carrying a locking means for securing the liftgate 20 in a fixed position closing the rear opening in the vehicle.

The liftgate 20 may be formed using any conventional manufacturing process, such as an outer panel 26 which can be joined to an inner panel, not shown.

An aperture or opening 30 is formed in the liftgate 20. The aperture 30 is closed by a transparent panel, such as a glass window 32. The window 32 may be fixedly attached to the rear liftgate panel 26 or, articulated itself about an upper generally horizontally extending edge 34 to the upper edge portion of the liftgate 20 by means of one or more hinges 36 for pivotal movement of the opposed bottom end 40 between a closed position, sealed to the liftgate 20 and an open, pivotal position spaced from the adjacent portions of the outer liftgate panel 26.

As is common, a defrost grid 42 is mounted in or on the glass window 32. Opposed ends of the defrost grid 42 terminate in electrical connections or pads 44 and 46.

Any portion of the window 32 may be covered by an internally mounted plate or sheet, typically covering the defrost contact pads 44 and 46 as well as lateral or side portions to define a central transparent vision portion in the glass window 32.

Referring now to the drawing, and to FIGS. 2-6 in particular, there is depicted one aspect of a component module 50 which is mountable on the liftgate window or flipglass 32, generally adjacent to the horizontally extending, lower edge 40. The module 50 provides a unitary mounted platform for a plurality of liftgate associated components, such as, in the present example, a window wiper drive motor 52 and a flip window latch unit 54.

Figure 5:
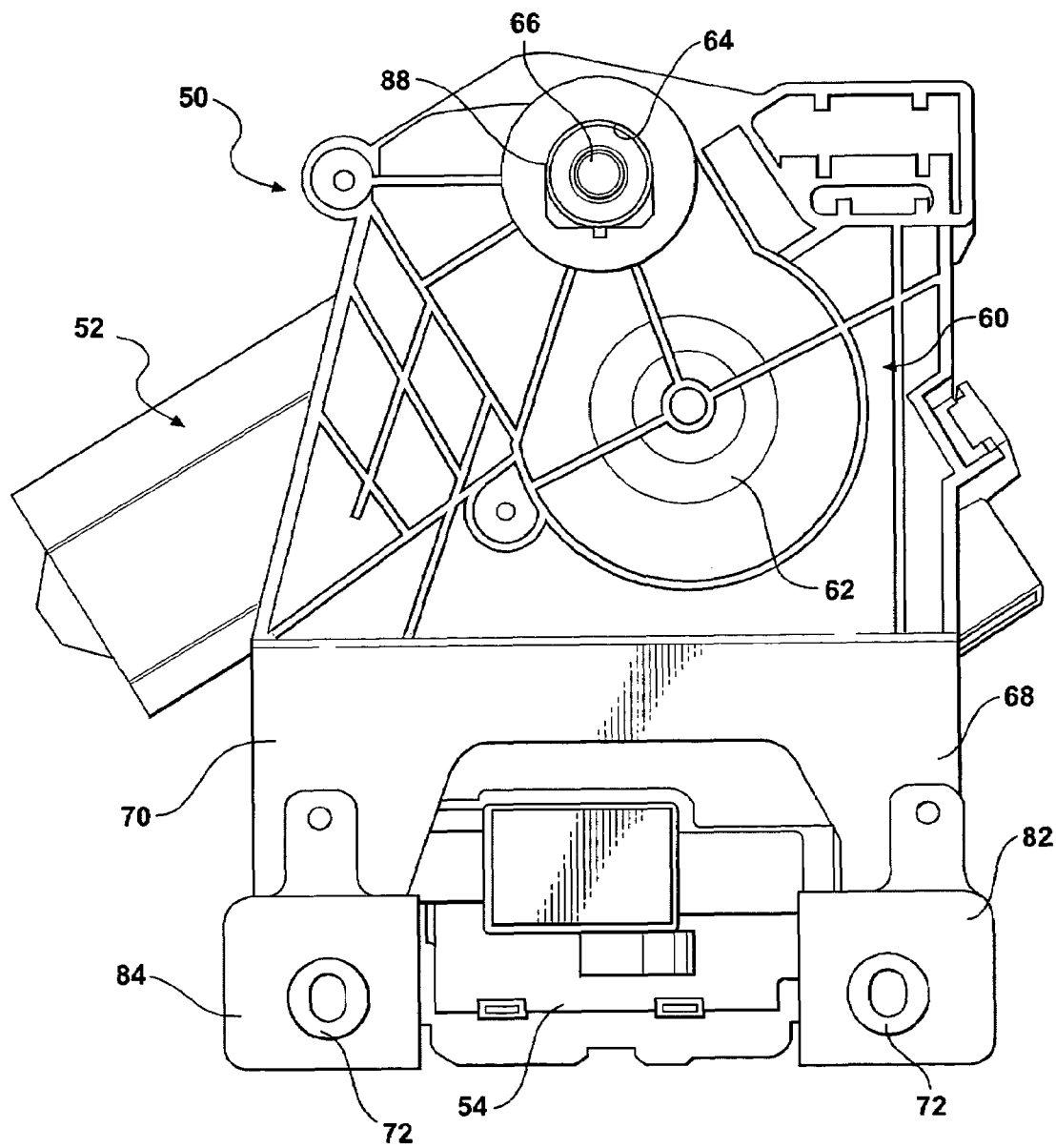
FIG. 5 is a rear elevational view of the component module shown in FIG. 4.

The module 50 includes a first mounting bracket 60 which, while it could be constructed as a separate member attached to the wiper drive unit 52, in one aspect of the invention, the mounted bracket 60 is formed as a integral extension of the housing of the wiper motor unit 52. The bracket 60 includes a base portion 62 with an aperture 64 for receiving the wiper motor drive shaft 66 therethrough as shown in FIG. 5. A pair of legs 68 and 70 depend from the base 62 and are spaced apart by an open-ended slot 74.

Figure 6:
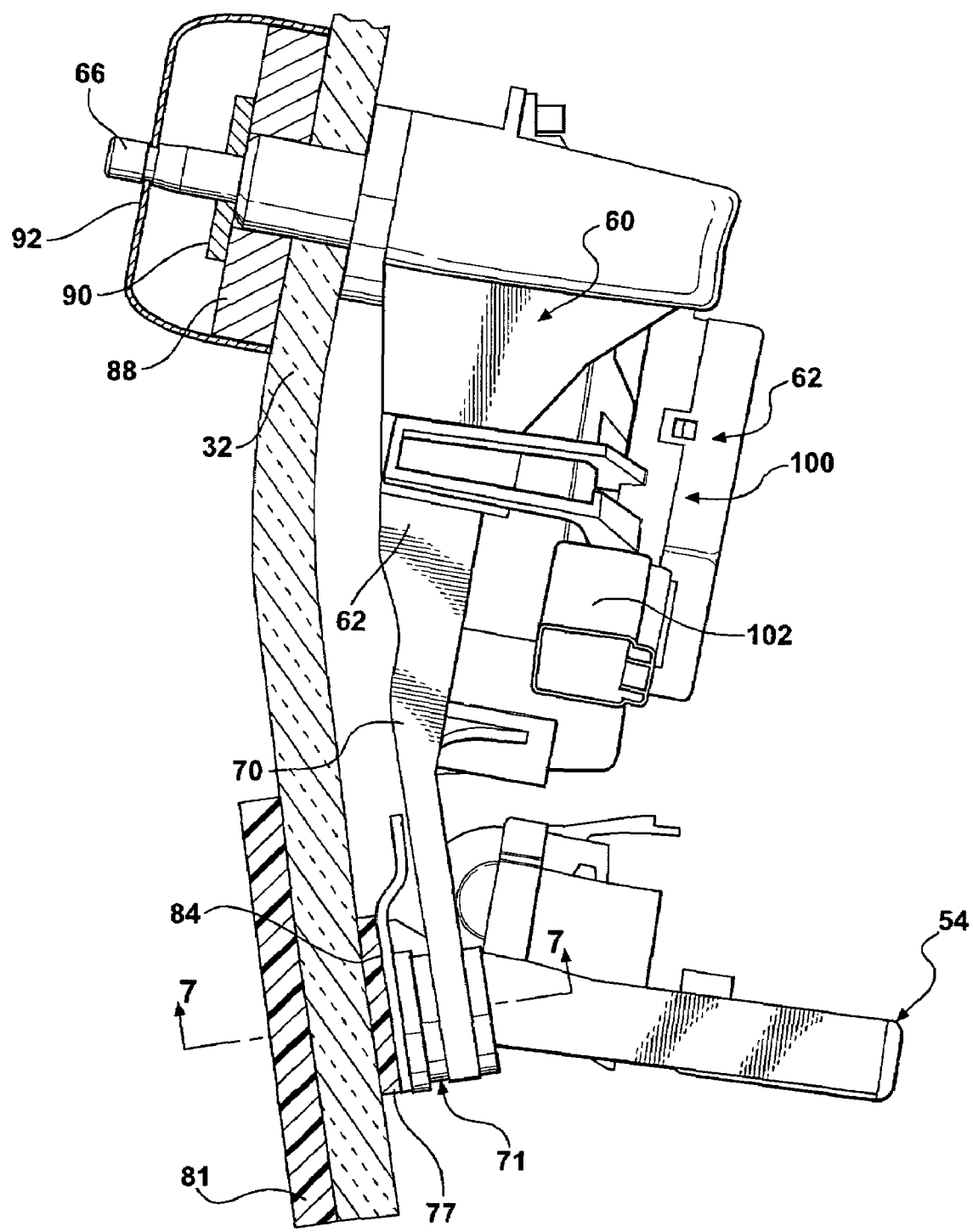
FIG. 6 is a left side elevational view of the component module shown in FIG. 4.
Figure 7:
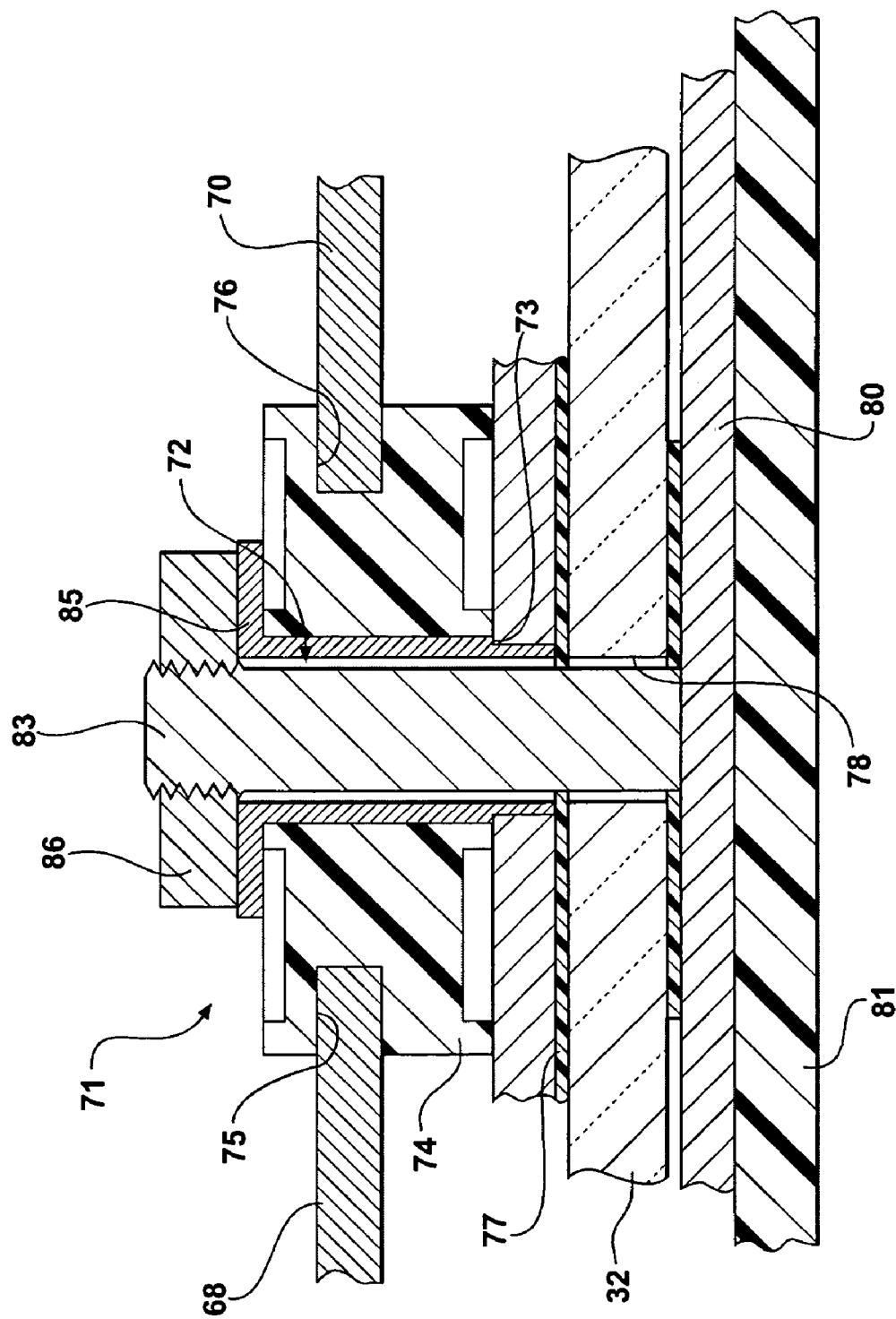
FIG. 7 is a cross-sectional view generally taken along line 7-7 in FIG. 6.

A mount 71 is provided for each of the legs 68 and 70 to connect each of the legs 68 and 70 to mounting plates 82 and 84 as well as to the liftgate glass or window 32 as shown in FIGS. 6 and 7. Each mount 71 includes a spacer means or sleeve 72 having a generally tubular shape with a narrow diameter end forming a shoulder 73. The shoulder 73 is fixedly coupled to one of the mounting plates 82 or 84 by a fixed joint, such as a press fit, a weld, adhesive, etc. Alternately, the sleeve 72 can be integrally formed as a one-piece part of the mounting plate 82 or 84. A flange 85 is formed as an integral part of or fixedly jointed to one end of the sleeve 72. Alternately, the flange 85 can be a separate washer.

A grommet 74 formed of a resilient material, such as rubber, polymer, etc., is mounted about the sleeve 72 and is capured under compression between one of the mounting plate 82 and 84 and the flange 85. The grommet 74 has a pair of opposed recesses 75 and 76, which may also be formed as opposed portions of one continuous annular recess, and which receive an inner edge of the legs 68 and 70 when the grommet 74 is fixedly inserted into a slot between the legs 68 and 70.

As shown in FIG. 7, the mounting plates 82 and 84 are fixedly positioned to the glass 32 with an intermediate resilient gasket 77 interposed therebetween. The grommet 74 thus vibrationally isolates the legs 68 and 70 of the bracket 60 from the mounting plates 82 and 84 and the liftgate glass 32.

As also shown in FIG. 7, a pair of apertures 78, only one of which is shown, are formed in the glass 32 and receive one of a pair of studs 83, each having a threaded end portion. The studs 83 are spacedly mounted on a stud plate 80 which is fixedly secured, such as by overmolding with a trim piece 81.

The studs 83 extend through the apertures 78 in the glass 32 and through the sleeve 72 and receive a fastener, such as a nut 86, to secure the entire mount 71 to the liftgate glass 32.

The upper end of the bracket 60 is fixedly secured to the window 32 by means of a spacer 88, a nut 90 and a cover 92, shown in FIG. 6, which are secured over a threaded portion of the motor output shaft 66.

A wiper arm assembly 78, shown in FIG. 1, is fixedly mounted over the outer end of the motor drive shaft 66 in a conventional manner. The wiper arm assembly normally rests on the outer surface of the liftgate window 32 as also shown in FIG. 1.

The mounting plates 82 and 84 are integrally formed as extensions of the housing of the window latch unit 54. The mounting plates 82 and 84 extend from the main portion of the latch housing and are disposed at an angle to the connector portion of each mounting plate to enable an end portion to wrap around an outer surface of the mounting legs 68 and 70 of the base 62. This enables the window latch unit 54 to be fixedly secured to the mounting bracket 60 by using the same connectors used to attach the lower end of the mounting bracket 60 to the window 32.

The window latch unit 54 can be a flipglass latch sold by Valeo, Model No. 2-3531-824. The latch 54 includes a pivotal claw which is moved between open and closed positions. In the closed position, the claw engages a striker mounted on the liftgate panel adjacent the bottom edge 40 of the liftgate window 32 to pull the bottom end 40 of the window 32 into sealed engagement in a closed position with the liftgate 20. Pivotal movement of the claw in the opposite direction releases the claw from the striker allowing the bottom edge of the liftgate window to be pivoted about the upper hinges to an open position with respect to the liftgate panel.

The housing of the motor unit 52 also supports a controller receptacle 100 which includes a connector or socket 102 for receiving a mating connector for supplying electrical power and activating signals to the motor unit 52 and the window latch 54. The individual connectors from the connector 102 to the motor unit 52 and the window latch 54 can be prewired on the module 50 prior to mounting of the module 50 on the window 52.

Another feature of the module 50 is the provision of connectors, with two connectors 104 and 106 being shown by way of example only, integrally formed on the base 62 of the bracket 60. The receptacles 104 and 106 each contain an aperture 108 which is designed to receive a suitable plug-in snap connector carried on an interior trim panel, not shown, which is mounted over the interior side of the module 50. The interior trim panel also snaps into similar receptacles mounted on strips attached to the inner surface of the window 52. Such additional mounted strips do not form part of the present invention.

In use, the module 50 is assembled as described above to unitarily integrate the wiper motor unit 52 and the window latch unit 54 into the one piece assembly. The mounting bracket 60 includes mounts for connection to mating mounting devices carried on the liftgate window 32 for fixedly securing the module 50 to the liftgate window 32 for movement with the window 32. The module 50 also includes connections for receiving connectors carried on an inner trim panel which covers an interior bottom surface of the liftgate window to encompass the module 50.

Referring now to FIGS. 8-15, there is depicted another aspect of a component module 110 according to the present invention. The component module 110 shares many of the same features and components with the component module 50 described above, but with several enhancements or new features.

As shown in FIGS. 8-14, the component module 110 includes a window wiper drive motor 112 having an output shaft coupled to a gear means or box 114. An output shaft from the gearbox 114 extends through one leg 116 of a handle 120, described hereafter, to an outer end 122. A wiper arm 124 is mounted over the end 122 of the output shaft and is fixedly connected to the output shaft by a locknut 126 for a reciprocal rotation of the wiper arm 124 with reciprocal rotation of the gearbox output shaft.

Figure 18:
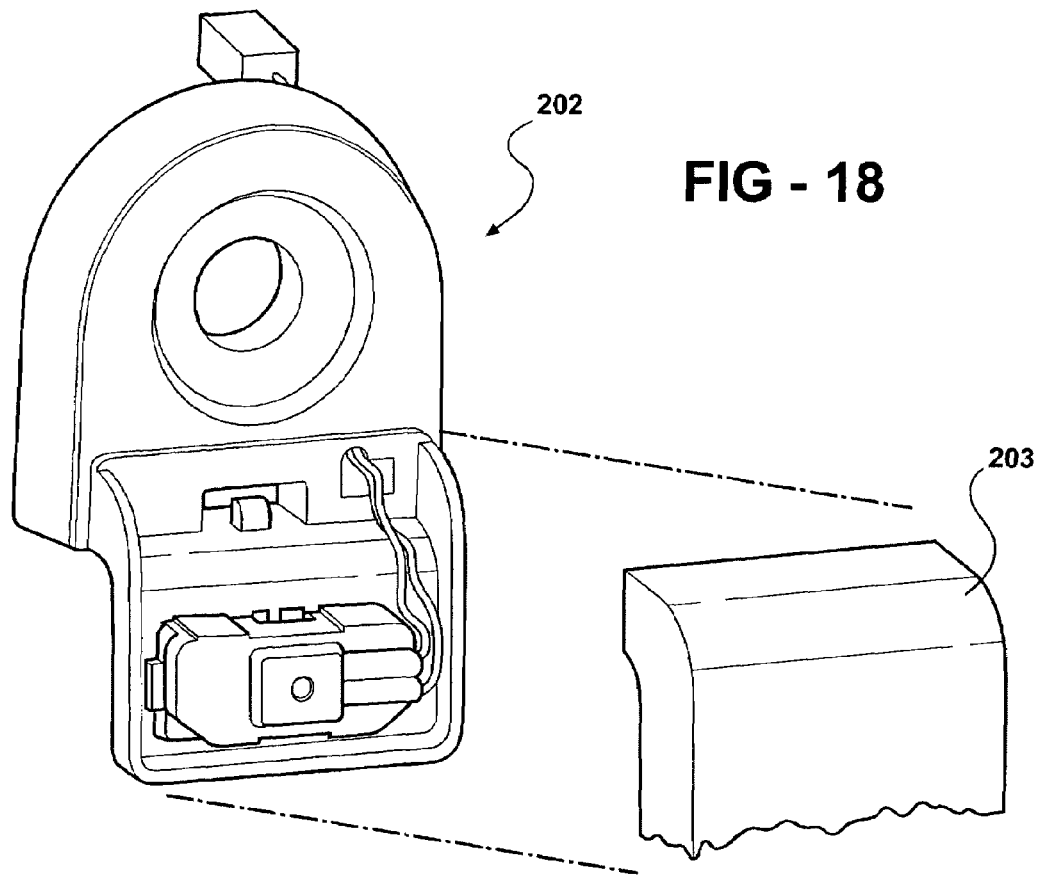
FIG. 18 is an exploded, perspective view showing the alternate handle construction depicted in FIG. 17 and the internally mounted electrical switch usable in all aspects of the present invention.

The handle 120, which could also be mechanical latch-type handle, is illustrated by example only as including an electrical switch 130 mounted within the housing of the handle 120, as shown in detail in FIG. 18. A membrane actuator 132, accessible exteriorly on the back of the handle 120, is provided as a seal over the switch 130. Depression of the membrane 132 causes depression of a plunger on the switch 130. Internal switch contacts then change positions to provide an output signal on output wires 134 to a control means or a controller, as described hereafter.

Figure 11:
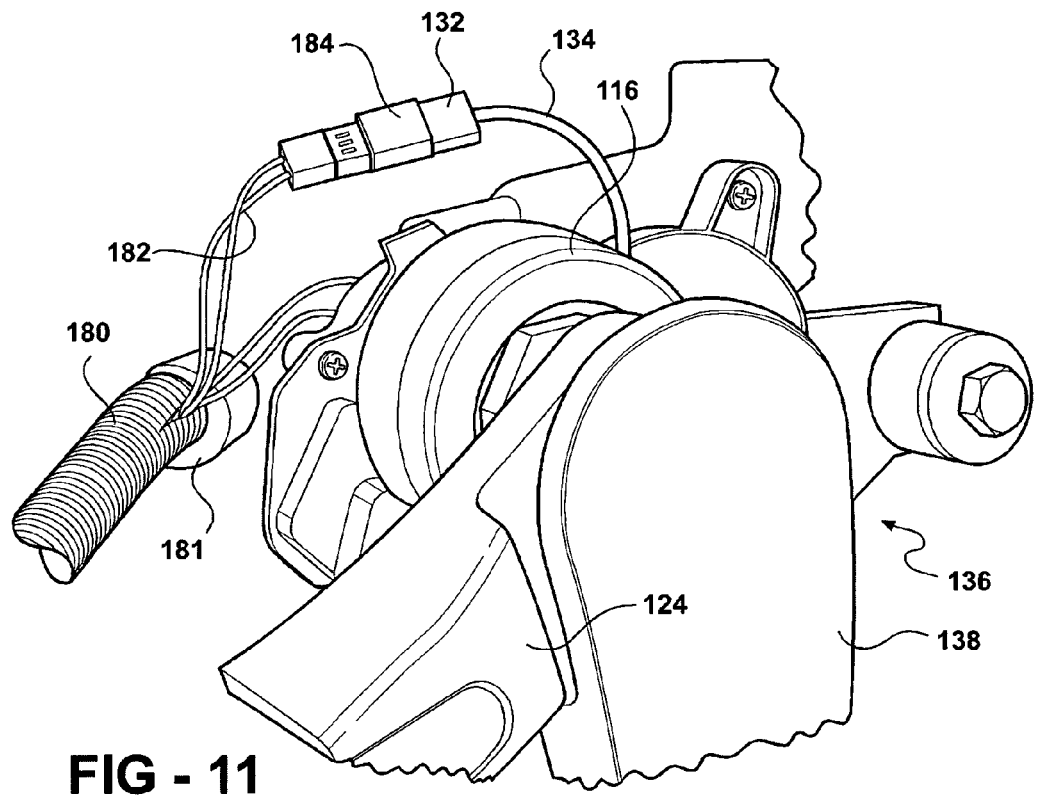
FIG. 11 is a partial perspective view from the exterior of the vehicle.
Figure 12:
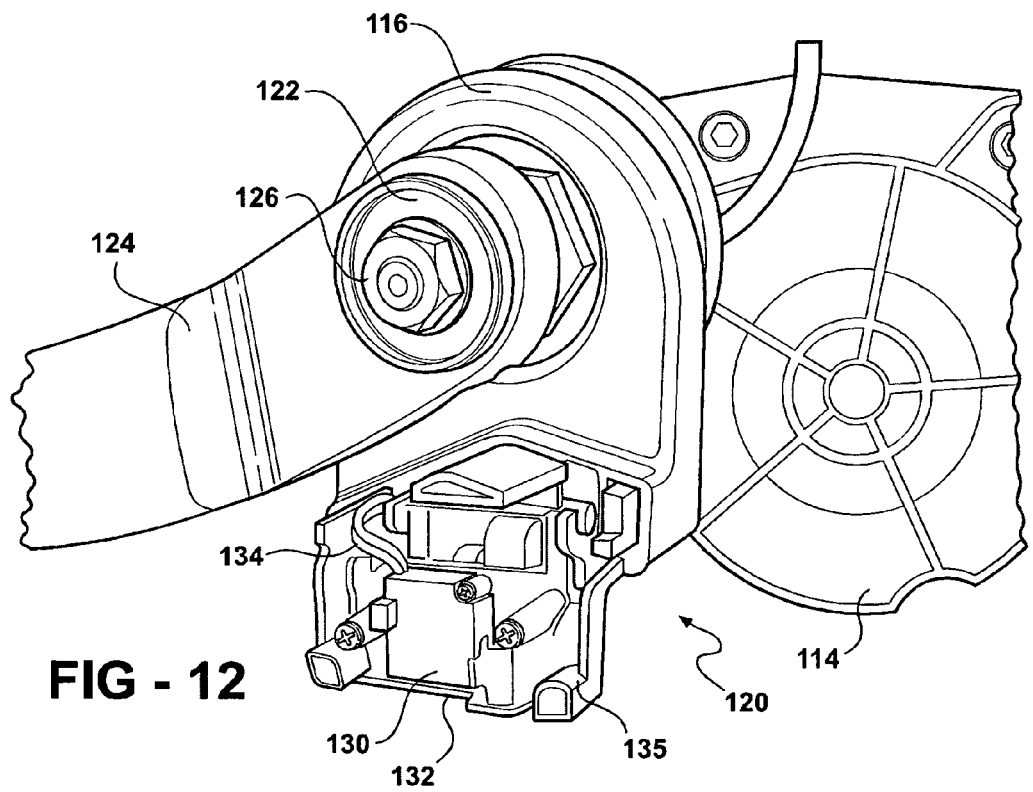
FIG. 12 is another partial perspective view, similar to FIG. 11 but with the external cover of the handle removed.
Figure 14:
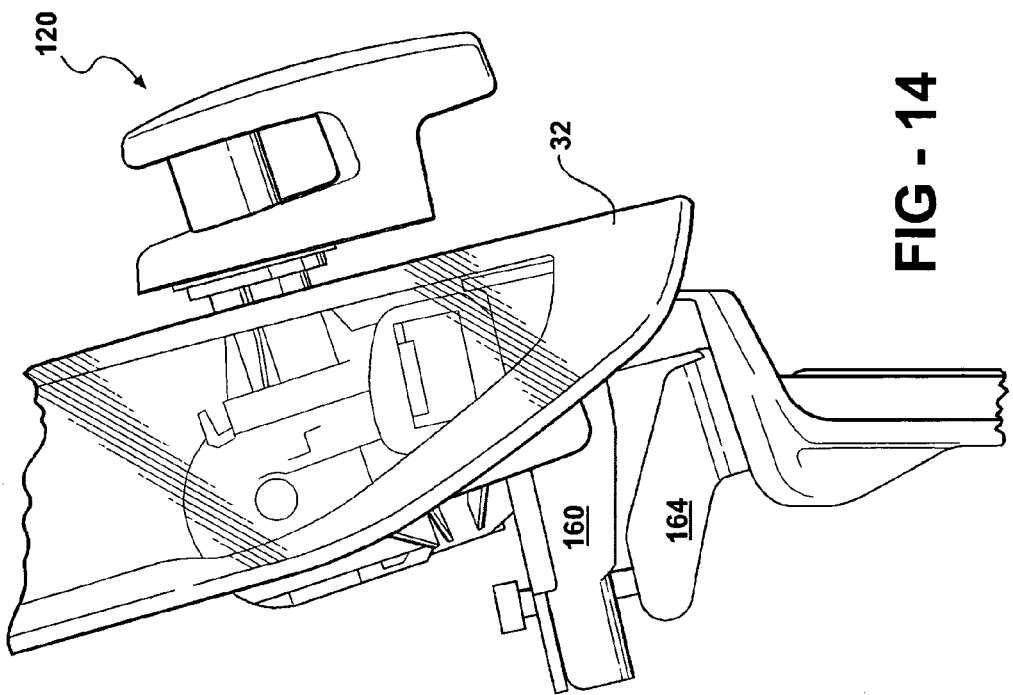
FIG. 14 is a left hand side elevational view of the component module shown in FIG. 8.
Figure 13:
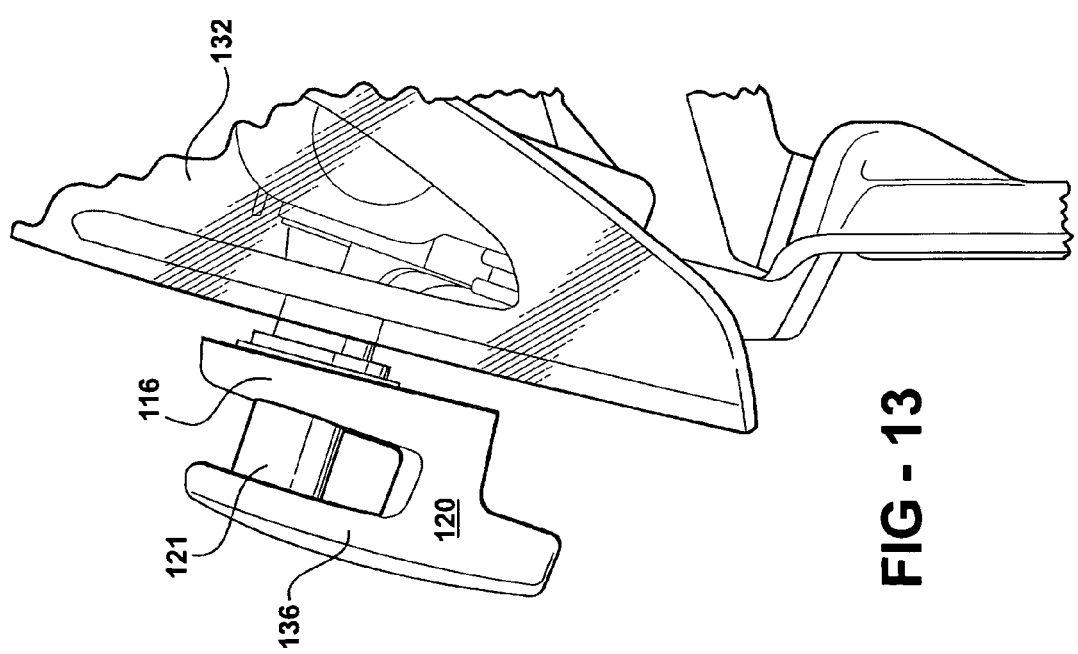
FIG. 13 is a right hand side elevational view of the component module shown in FIG. 8.
Figure 17:
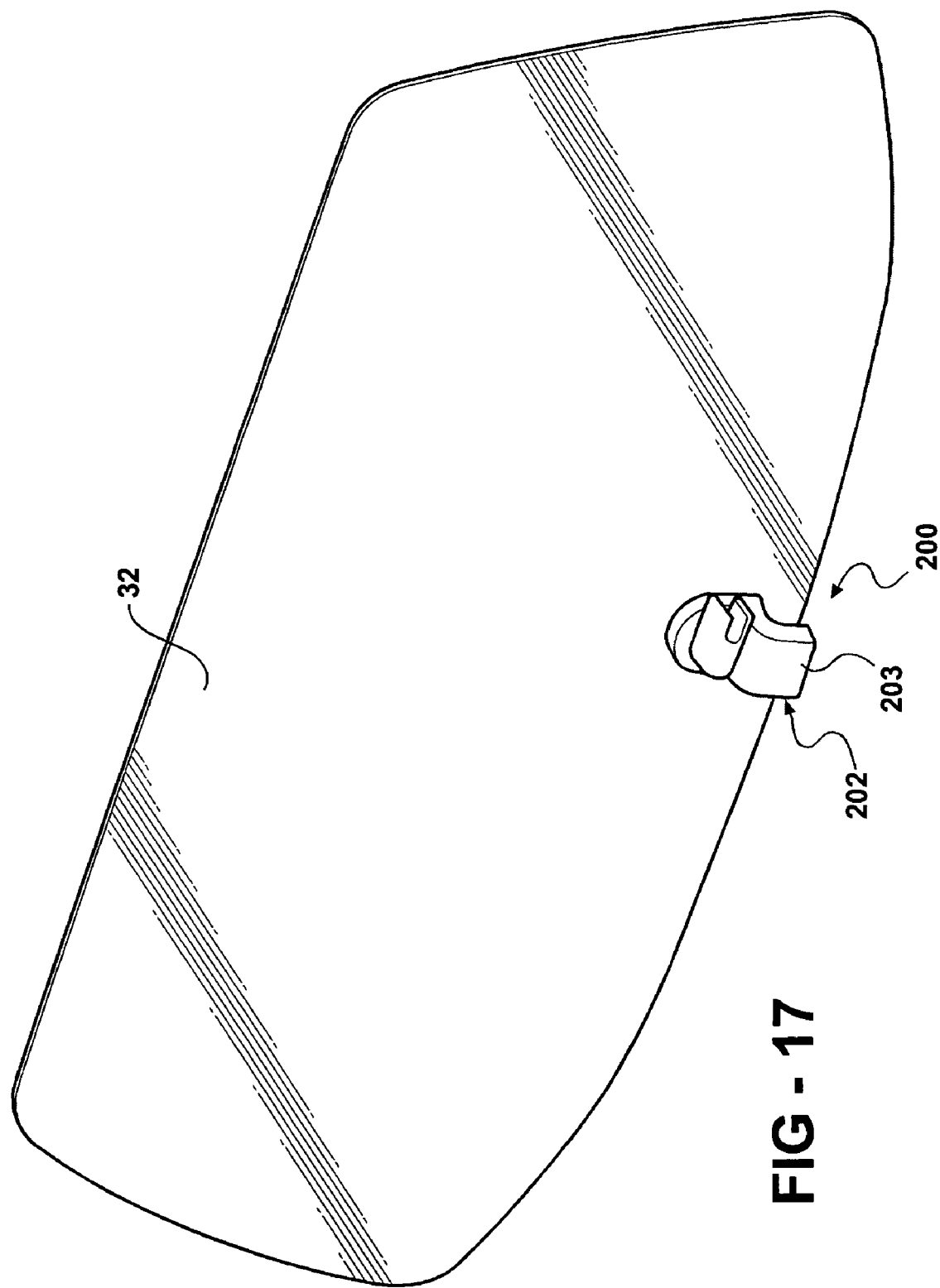
FIG. 17 is a perspective view of another aspect of a component module mounted on a liftgate flipglass.

An outer cover 136, shown in FIGS. 8, 10, 11 and 13, is releasably fixed or snapped to a base portion 135 of the handle 120. A cover yoke or leg 138 is spaced from the leg 116 outboard of the wiper arm 124 as shown in FIGS. 11 and 12.

The component module 110 includes a first mounting means or mount 140 which could be constructed as a separate member attached to the wiper gearbox 114 and/or the drive motor 112. By way of example, however, the mount 140 is formed as an integral extension of the motor housing. An annular ring or aperture 144 is located on the mount 140 and receives a grommet 142 for vibrationally sealing the motor drive unit 111 to the flipglass 32. Another mounting point for the motor drive unit 114 is a point of passage of the gearbox tower 121 through the aperture in the flipglass 32. A flange 141 is attached to the gearbox housing and forms another mount for the motor drive unit 111.

The seal member formed of resilient material, such as rubber, a polymer, etc., may be mounted about a ring on the gear box housing.

Component module 110 also includes the flipglass latch means or latch 160 which may be a flipglass latch sold by Valeo, Model No. 2-3531-824. The latch 160 includes a pivotal claw, not shown, which is moved between open and closed positions by an electrically operated actuator in the housing of the latch 160. In a closed position, the claw engages a striker 162 fixedly mounted on and extending generally upward from a stationary panel 164 carried in the liftgate. The claw, when engaging the striker, pulls the bottom end of the flipglass 32 into sealed engagement in a closed position with the liftgate 20.

Pivotal movement of the claw in the opposite direction releases the claw from the striker 162 allowing the bottom edge of the liftgate flipglass 32 to be pivoted about upper hinges to an open position with respect to the liftgate 20.

At least one and preferably a plurality, with two being shown by way of example only, mounting flanges 170 and 172 are provided for the latch 160. The mounting flanges 170 and 172 are integral with a base plate fixed to the housing of the latch 160 as shown in FIG. 16. The mounting flange 170 has an end flange 174 which engages a metal plate, not shown, fixed on the flipglass 32 as generally shown in FIG. 7. A stud extends from the plate through the apertures in the flange 172 and the flipglass 32 and is secured to a nut to fixedly mount the latch 160 to the flipglass 32.

The other mounting flange 172 also has an aperture 173 at one end. The flange 172 engages the metal plate disposed in contact with the flipglass 32. A stud extends through an aperture in the flange 172 for fixedly securing the latch 160 to the flipglass 32.

In addition, a mounting flange 179 having an apertured end extends from the gearbox 114 housing and is superimposed on the flange 172. A grommet is mounted in the end of the flange 179 and vibrationally isolates the flange 179 from the mounting flange 172. However, the stud extending from the mounting flange 172 also passes through the aperture in the flange 179 and the grommet mounted thereon and is secured in place by a nut to couple the mounting flange 179 to the fixed connection behind the mounting flange 172 and spaced from the flipglass 32.

As partially shown in FIG. 11, a harness 180 extends from a control means or controller 190 associated with the motor 112 and mounted in a housing on the gearbox 114 as shown in FIG. 16. The harness includes conductors to provide power and control signals to the wiper motor 112 and conductors 182 and connector 184 to the handle switch output. The harness 180 may receive battery power and other vehicle control signals from other control elements in the vehicle via an end connector 181. However, the connectors 184 connect the wires 134 extending from the switch 130 in the handle 120 to the control means 190, shown schematically in FIG. 15.

Due to the proximity of the wires 134, the wires in the harness 180, the switch 130, the latch 160, and the fast processing time of the controller response, such as release of the claw from the striker 162 upon activation of the switch 130, is substantially immediate or simultaneous with actuation of the switch 130. This provides a favorable response to the user and enables the user to depress the switch button and simultaneously pull outward on the lower end of the flipglass 32 in a single, easy motion.

Figure 8:
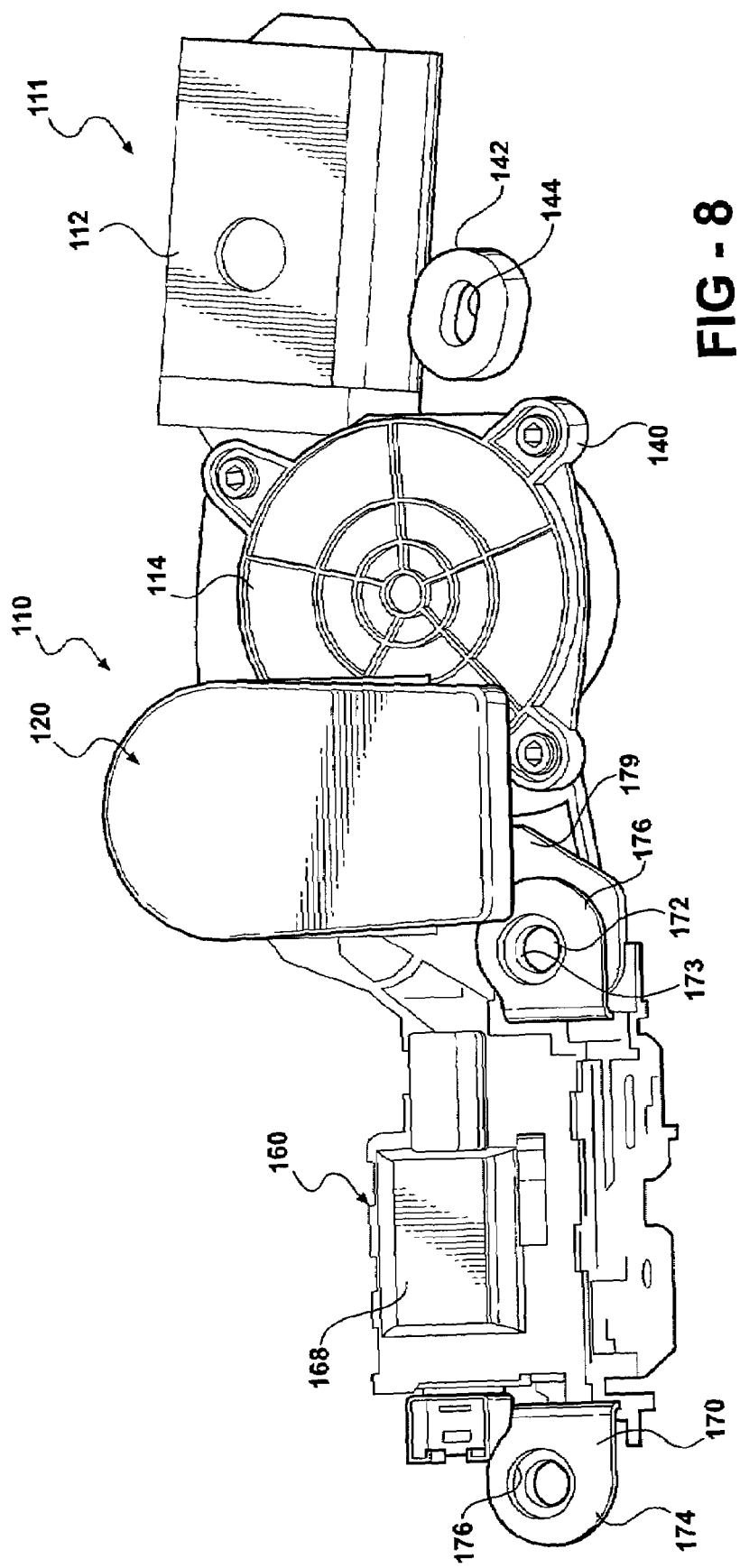
FIG. 8 is a perspective view of another aspect of a component module according to the present invention shown mounted on a vehicle liftgate flipglass.
Figure 9:
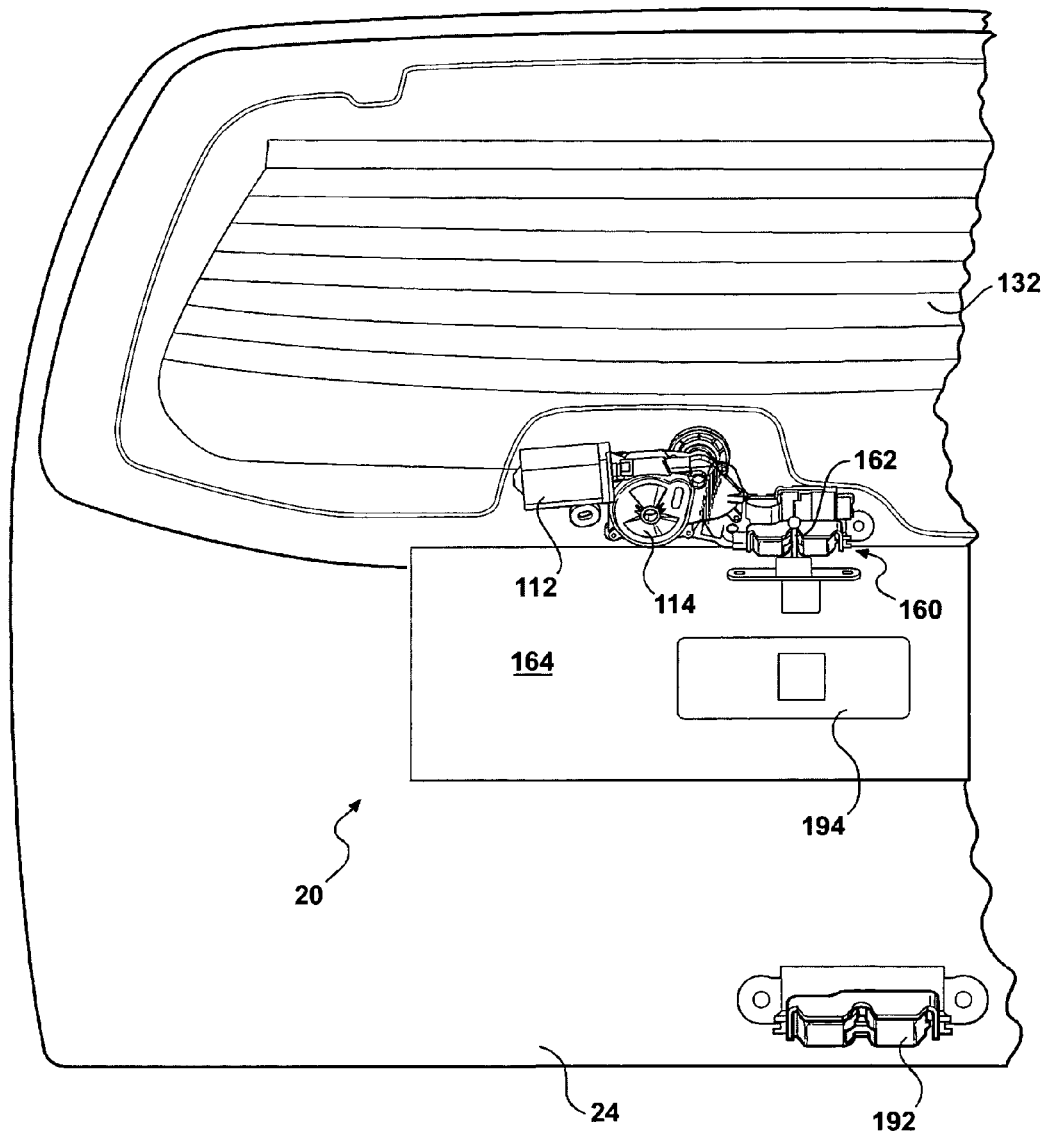
FIG. 9 is an elevational view of the component module shown in FIG. 8, taken from the interior of the vehicle and showing engagement of the flipglass latch and a striker mounted on the liftgate.
Figure 10:
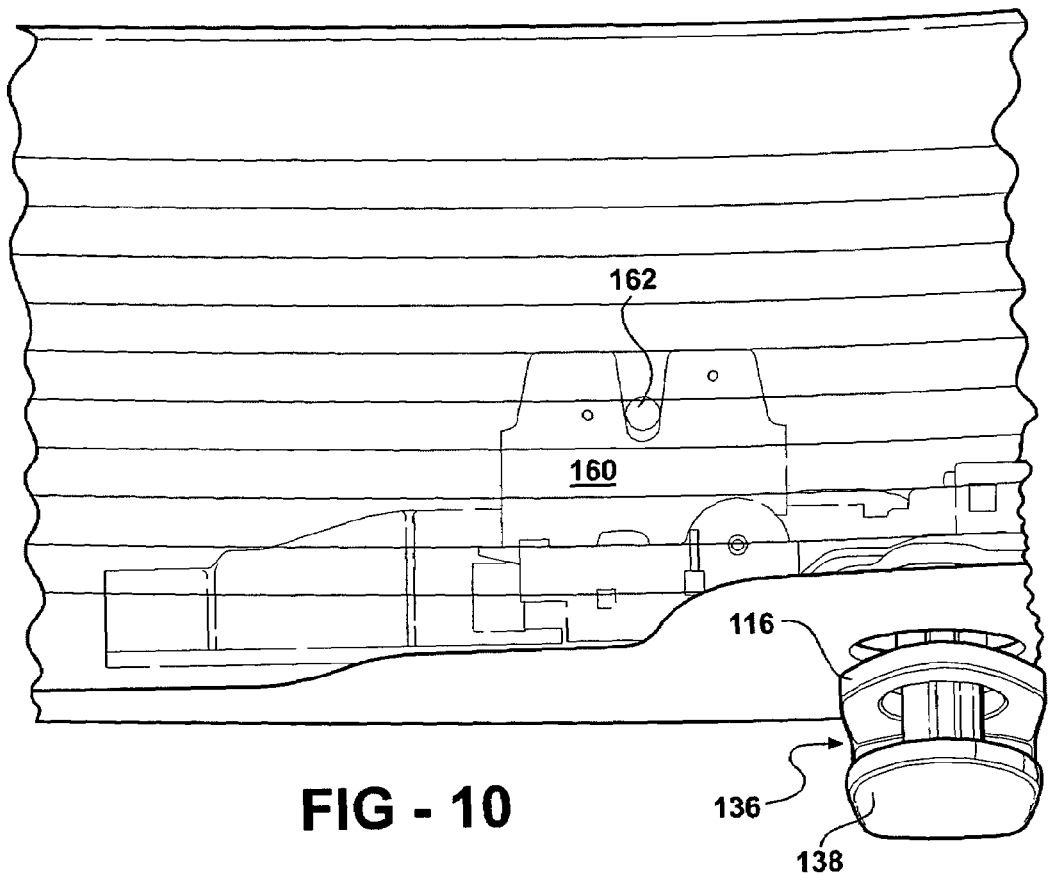
FIG. 10 is a perspective plan view of the component module shown in FIG. 9.

As shown in FIGS. 8 and 9, the drive motor 112, the gearbox 114, and the latch 160 are arranged in a substantially linear orientation from end to end. This reduces the overall height of the component module 110 so as to maximize visible viewing glass in the flipglass 32.

Referring to FIGS. 9 and 15, there is depicted the use of the controller 190 to also control a liftgate latch means 192 and a liftgate electrical handle switch 194 mounted generally lower on the liftgate panel than the wiper motor 112. The latch 192 will be similar to the latch 160 in that it latchably receives a striker mounted on a lower edge of the vehicle body. Control signals from the controller 190 to the latch means 192 operate in the same function as for the latch means 160 describe above.

In addition, a liftgate handle in the form of an electronic switch 194 is mounted on the liftgate panel as shown in FIG. 9. The handle switch 194 can be constructed and operated in the same manner as the handle switch 120 described above for the flipglass 32.

As shown in FIG. 15, conductors 196 extend from the latch 192 and the switch 194 to the controller 190 mounted on the flipglass 32. The close proximity of the switch 194, the latch 192 and the controller 190 as well as the quick processing speed of the controller 190 provides a quick response from the time the switch 194 is activated to operation of the latch 192.

Referring now to FIGS. 17-21, there is depicted another aspect of a component module 200 which includes many of the same features as the component module 110.

In this aspect, the handle 202 is mounted on the output shaft of the motor gear box along with one end of a wiper arm, in the same manner as described above. However, the handle 202 lacks the cover leg of the module 110. As shown in FIGS. 17-20, the cover 203 extends only over the lower portion of the handle 202 which contains the switch 130.

Figure 19:
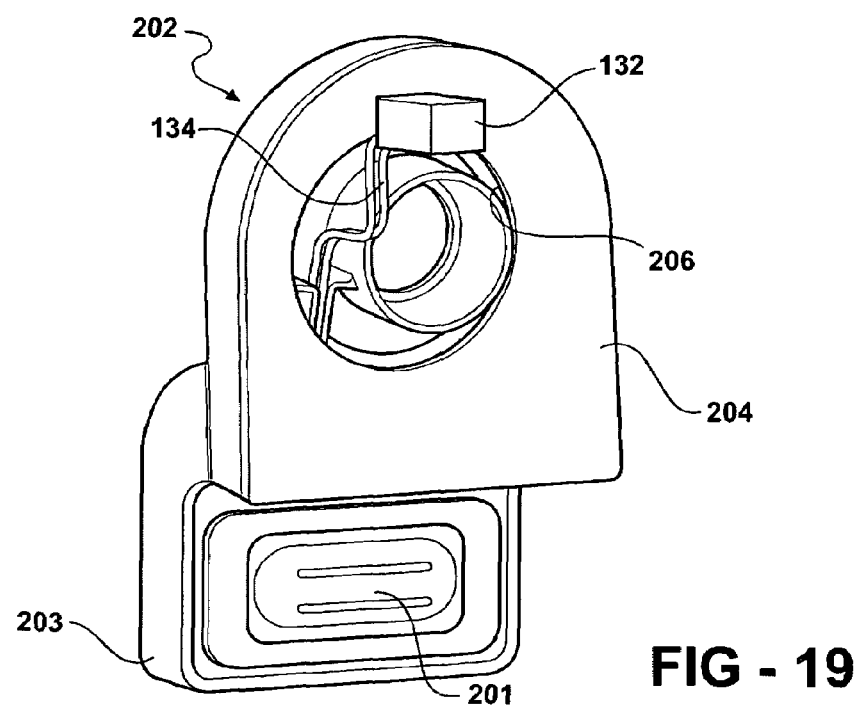
FIG. 19 is a rear perspective view of the handle and switch shown in FIG. 18.
Figure 20:
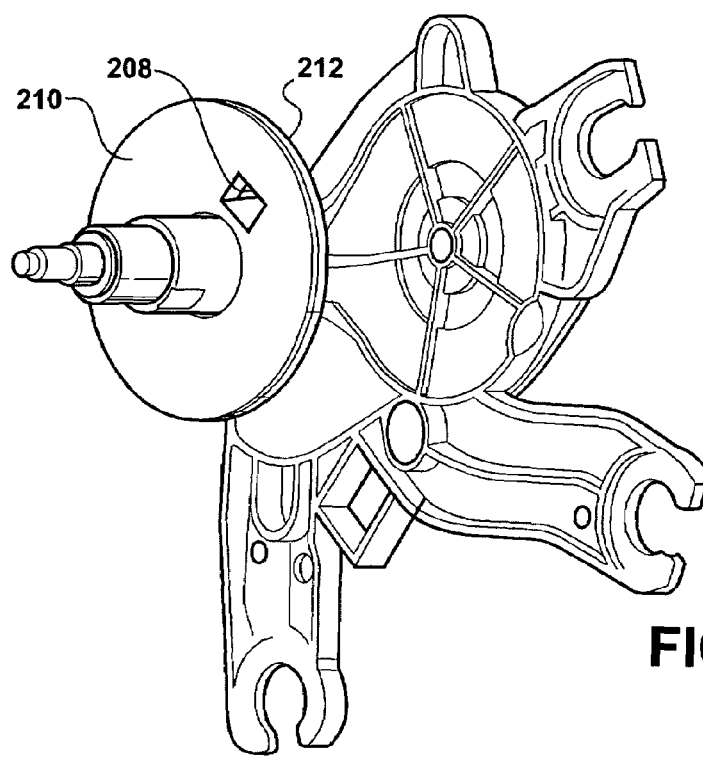
FIG. 20 is perspective view of the drive motor cover plate and flipglass mounts for the component module shown in FIGS. 17-19.
Figure 21:
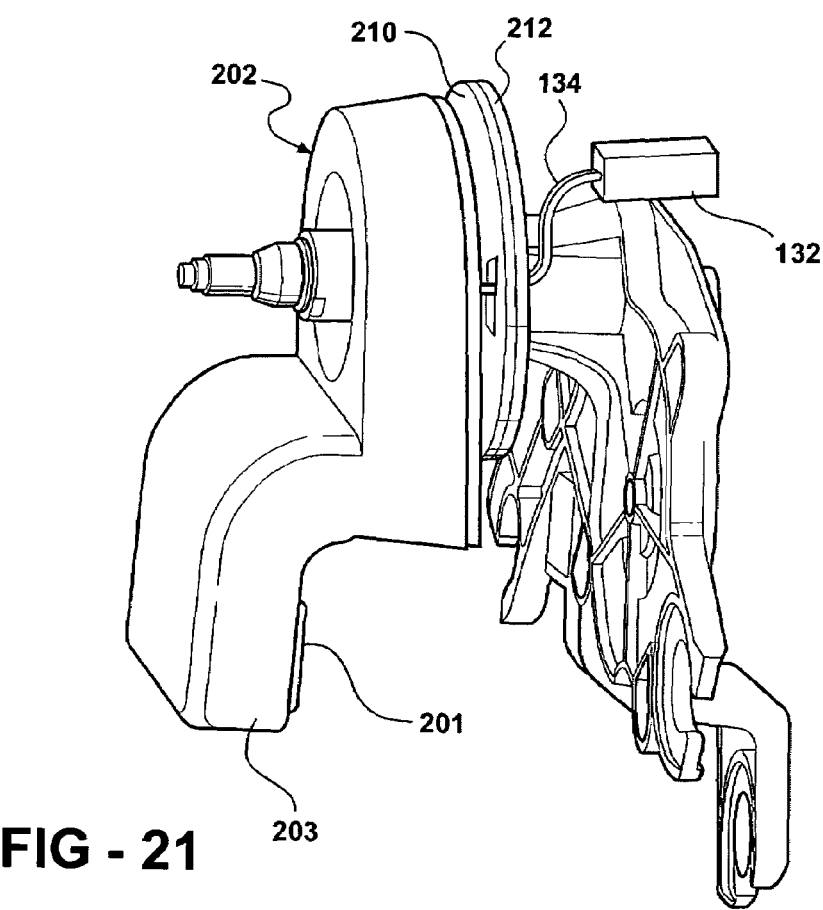
FIG. 21 is a side perspective view depicting the mounting of the handle of FIGS. 17-19 on the drive motor cover plate of FIG. 20.

The rear surface of the handle 202 shown in FIG. 19 illustrates membrane 201 covering the switch plunger. As the lower edge of the handle 202 is spaced from the flipglass 32, a user can simply extend his or her fingers behind the lower edge of the handle 202 and engage and depress the membrane 201 to activate the switch 130 to release the latch 160 for opening pivotal movement of the flipglass 32.

Also shown in FIG. 19 is a resilient washer or seal 204 which sealingly interfaces the handle 202 to the flipglass 32. An opening 206 is formed in the seal 204 for allowing passage of the wires 134 from the switch 130. The wires 134 which terminate in a connector 132 pass through a similar aperture 208 in a seal 210 and a shoulder 212 of the motor gear box cover plate shown in FIGS. 20 and 21. The connector 132 can then be joined to a mating connector 184 extending outward from the harness carrying wires to and from the controller 190.

The use of the present module substantially reduces the assembly of the components on a vehicle liftgate since the module carrying the components is attachable to the liftgate window in a single assembly operation thereby reducing assembly time, the number of workers required, as well as increasing reliability of the individual components which can be preassembled and pretested, if necessary. Further, the module reduces the number of separate electrical connections and mechanical connection point for further manufacturing cost saving and increased reliability of the module mounted components.

The present module also uniquely provides a handle mounted on an output shaft of a window wiper drive means, extending through a pivotal flipglass of a vehicle liftgate. Control signal wires from an electrical switch of the handle are routed directly to a controller mounted in the flipglass latch so as to provide substantially immediate response or release of the claw of the latch means upon actuation of the handle switch.

What is claimed is:

1. A liftgate component module mountable on a movable liftgate window carried on a vehicle liftgate, the module comprising:
   a window wiper drive means for reciprocating a wiper arm;
   a window latch means for releasably latching a liftgate window to a liftgate;
   means for unitarily joining the wiper drive means and window latch means;
   the unitarily joining means fixedly mounted to the liftgate window; and
   handle means mounted exteriorly to the liftgate window, the handle means operative to effect release of the latch means for opening movement of the window relative to the liftgate.

2. The module of claim 1 wherein the handle means comprises:
   electrical handle means for generating a window latch release signal when activated.

3. The module of claim 2 further comprising:
   control means carried on one of the joined wiper drive means and window latch means and responsive to the window latch release signal for controlling the window latch means; and
   the window latch means release signals from the electrical handle connected from the handle to the control means.

4. The module of claim 1 further comprising:
   a plurality of mounting flanges carried on the joined wiper drive means and window latch means;
   apertures formed in each of the plurality of mounting flanges for receiving fasteners for mounting the wiper drive means and the window latch means on window.

5. The module of claim 4 further comprising:
   dampening members coupled between the flanges and the wiper drive means to vibrationally isolate the wiper drive means from the window.

6. The module of claim 4 further comprising:
   a fastener extending through the aperture in the mounting flange to the drive means and the latch to join a portion of the mounting flange, the drive means and the latch to the window.

7. The module of claim 6 wherein:
   at least one of the mounting flanges is unitary with the latch means.

8. The module of claim 1 wherein:
   the drive means, including a drive motor and a gear transmission, and the window latch means orientated substantially linearly with respect to a bottom edge of the liftgate window.

9. The module of claim 1 wherein:
   the wiper drive means has a rotatable output shaft extending through an aperture in the window; and
   a window wiper and the handle means carried on the output shaft exteriorly of the liftgate, the wiper arm fixed to the output shaft for common rotation of the wipe arm and output shaft.

10. A liftgate component apparatus mountable on a movable liftgate window carried on a vehicle liftgate, the apparatus comprising:
    a window wiper drive means for reciprocating a wiper arm;
    a window latch means for releasably latching a liftgate window to a liftgate;
    a liftgate latch means for releasably latching a liftgate to a vehicle;
    electrical handle means for generating a window latch release signal when activated;
    electrical handle means for generating a liftgate latch release signal when activated; and
    control means, carried on the liftgate window, and responsive to the window latch release signal and the liftgate latch release signal, for controlling the operation of the window latch and the liftgate latch.

11. The apparatus of claim 10 wherein:
    the control means is responsive to external signals for controlling the window wiper drive means.

* * * * *

UNITED STATES PATENT AND TRADEMARK OFFICE
CERTIFICATE OF CORRECTION

| | | |
|---|---|---|
| PATENT NO. | : 7,246,840 B2 | Page 1 of 1 |
| APPLICATION NO. | : 10/862266 | |
| DATED | : July 24, 2007 | |
| INVENTOR(S) | : Terence M. Gates et al. | |

It is certified that error appears in the above-identified patent and that said Letters Patent is hereby corrected as shown below:

Column 10, Line 37; In Claim 9, delete "wipe" and insert --wiper--, therefor.

Signed and Sealed this

Sixth Day of November, 2007

JON W. DUDAS
*Director of the United States Patent and Trademark Office*